(12) United States Patent
Horton

(10) Patent No.: US 8,431,236 B2
(45) Date of Patent: *Apr. 30, 2013

(54) LAYERED WOOD COMPOSITES

(75) Inventor: John Horton, Peachtree City, GA (US)

(73) Assignee: Osmose, Inc., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,846

(22) Filed: Jan. 11, 2012

(65) Prior Publication Data

US 2012/0183798 A1 Jul. 19, 2012

Related U.S. Application Data

(63) Continuation of application No. 12/473,394, filed on May 28, 2009, now Pat. No. 8,182,928, which is a continuation of application No. 11/467,368, filed on Aug. 25, 2006, now Pat. No. 7,544, 423.

(60) Provisional application No. 60/711,202, filed on Aug. 25, 2005.

(51) Int. Cl.
*B32B 23/04* (2006.01)

(52) U.S. Cl.
USPC ......... 428/535; 428/536; 428/537.1; 427/408

(58) Field of Classification Search .................. 428/535, 428/536, 537.1; 427/408
See application file for complete search history.

(56) References Cited

U.S. PATENT DOCUMENTS

| | | | |
|---|---|---|---|
| 4,657,789 A * | 4/1987 | Lars | 427/372.2 |
| 5,234,747 A * | 8/1993 | Walser et al. | 428/215 |
| 5,405,705 A * | 4/1995 | Fujimoto et al. | 428/537.1 |
| 6,620,349 B1 * | 9/2003 | Lopez | 252/607 |
| 7,544,423 B2 * | 6/2009 | Horton | 428/535 |
| 8,182,928 B2 * | 5/2012 | Horton | 428/535 |
| 2001/0017186 A1 | 8/2001 | MacPherson et al. | |
| 2003/0026942 A1 | 2/2003 | Hejna et al. | |

FOREIGN PATENT DOCUMENTS

| | | |
|---|---|---|
| CL | 199900828 | 12/1999 |
| JP | 2001279917 A | 10/2001 |
| WO | WO-0020203 A1 | 4/2000 |
| WO | WO-0191925 A1 | 12/2001 |
| WO | WO-2005098135 A1 | 10/2005 |

OTHER PUBLICATIONS

Deppe, H.J., "Examination of the Protective Treatment of Plywood," Bundesanst. Mater., 1986, pp. 333-340, vol. 44(9), Holz als Roh-und Werkstoff, Berlin-Dahlem, Germany.

Gardner, D.J. et al., "Wood Composite Preservation," American Chemical Society, Symposium Series, 2003, pp. 399-419, Chap. 24, USA.

International Search Report and Written Opinion for PCT/US2006/033449 dated Apr. 23, 2007.

International Preliminary Report on Patentability for PCT/US2006/033449 dated Mar. 6, 2008.

* cited by examiner

*Primary Examiner* — Leszek Kiliman

(74) *Attorney, Agent, or Firm* — Covington & Burling LLP; Einar Stole; Jessica L. Parezo

(57) ABSTRACT

A method for the preparation of a composite product, as well as the composite product. The composite product comprises at least two layers. At least one of the layers is of wood or another cellulose-containing material. The process comprises differentially treating the layers prior to, during, or after the lamination of the layers into a composite product.

37 Claims, No Drawings

LAYERED WOOD COMPOSITES

CROSS-REFERENCE TO RELATED APPLICATIONS

This application is a continuation of, and claims the benefit under 35 U.S.C. §120 of, U.S. patent application Ser. No. 12/473,394, filed May 28, 2009, which is a continuation of, and claims the benefit under 35 U.S.C. §120 of, U.S. patent application Ser. No. 11/467,368 filed Aug. 25, 2006, now U.S. Pat. No. 7,544,423, which claims the benefit under 35 U.S.C. §119 of U.S. Provisional Application Serial No. 60/711,202, filed on Aug. 25, 2005, the disclosures of which are hereby incorporated by reference in their entireties.

BACKGROUND OF THE INVENTION

Composite cellulosic products are often treated in order to impart desirable qualities such as insect resistance, durability and hardness. Such methods generally involve treating a composite product after it has been formed from component layers, or treating a surface layer prior to its lamination to core lamellae. Such core lamellae, if multilayered, are generally of layers which have been identically treated prior to their assembly into a composite product with the surface veneer.

A review entitled "Wood Composite Protection" [Gardner, Douglas J.; Tascioglu, Cihat; Walinder, Magnus E. P.; ACS Symposium Series (2003), 845 (Wood Deterioration and Preservation), 399-419] discloses the pre-assembly treatment of wood layers with a solution of CCA (page 404, second paragraph).

A Japanese Patent, JP 2001279917 to Hisao Iwamoto, discloses the treatment of a single veneer with an insecticide, followed by the attachment of the veneer to a surface veneer. The reference also discloses that a cosmetic coating can be applied to the surface veneer after assembly (paragraph 0013).

A German journal article entitled "Protective Treatment of Building Plywood" [Deppe, H. J.; Bundesanst. Mater., Berlin-Dahlem, Fed. Rep. Ger.; Holz als Roh-und Werkstoff (1986), 44(9), 333-40] discloses treatment of two layers—a surface layer and an underlayer ("core lamella")—with a preservative by different processes prior to their assembly into a composite wood product. That the underlayer can be of multiple veneers (core lamellae) is also disclosed. A process which includes the treatment of the core lamella with and a simple immersion for the surface sheets is disclosed (see Conclusion). However, no applications involving the differential treatment of multiple wood layers such as veneers and laminates prior to assembly into a multilayer composite product are disclosed.

There exists a need for a process which can be used to prepare a wood product having an internal distribution of a process parameter such as, for example, a biocide, which can be precisely tailored such that the characteristics of the wood are appropriate for the wood's intended use. There is also a need for such a wood product.

SUMMARY OF THE INVENTION

Provided is a method for the preparation of a composite product, as well as the composite product. The composite product comprises at least two layers. At least one of the layers is of wood or another cellulose-containing material. The process comprises differentially treating the layers prior to, during, or after the lamination of the layers into a composite product.

DETAILED DESCRIPTION OF THE INVENTION

"Veneer" as used herein, denotes wood which is of a thickness to be used in a layered wood product. Typical veneers generally have a thickness of two inches or less, although thicker veneers can be used if required by an application. "Composite product" denotes a product made of multiple veneers, i.e., in numbers as low as two and as high as, for example, 100. The number of veneers in a composite product can be even or odd. The thicknesses of the multiple veneers in a composite product can correspond to any of a wide range of thickness distributions. The veneers in the composite product can be oriented such that the grains of overlying veneers are oriented at any angle to overlying and underlying veneers. For example, the grains of two veneers in a composite product can be parallel or mutually perpendicular, or at other angles with respect to each other.

Veneers can be lumber, "composite wood products" including but not restricted to wood laminates, plywood, LVL, OSB, PSL, Particleboard, GLUELAM, MDF, wood plastic composite, plastic composite, cement composite, plastic, or other "composite wood products" comprising plastic, polymers, wood, cement, metal or other cellulose materials, wood, partial wood or alternative materials.

Lumber is often made from recycled wood and plastic. Wood Plastic Composites typically consist of a mix of wood fibers from recovered saw dust and waste plastics that include high-density polyethylene, PVC (polyvinyl chloride), as well as other types of thermoset plastic polymers. A common mixture is 50/50 by weight. The material is formed into both solid and hollow profiles. The wood fibers generally act as reinforcement, and thus Recycled wood/plastic composites are typically more rigid than 100 percent recycled plastic lumber. In addition, the plastic may encapsulate and bind the wood together to resist moisture penetration and degradation from fungal rot.

Another example of material from which veneers can be made is High Density Polyethylene (HDPE). HDPE is a common resin used by the thermoplastics industry to make products from toys to packaging. This resin is particularly suitable because of its high extrusion viscosity, dimensional stability, and compatibility with other ingredients.

Polyvinyl Chloride (PVC) is a common thermoplastic used in the manufacture of building products and is also a suitable material from which veneers can be made. The material is particularly suitable because of its high stiffness capability, high mechanical strength, modest cost, and excellent weather resistance.

Cellulose fiber-reinforced cement can also be used in the manufacturing of veneers. For example, fiber-cement building boards are made by combining, silica (quartz), calcium silicate, and cellulose fiber, for example, in a 40:50:10 weight ratio, and water. A rigid fiber-cement product material which is formed under heat and pressure is to a large extent moisture proof, fire proof, resistant to decay and termites. The material can be made to be highly UV resistant if inorganic pigments are added to the material mixture.

The term "composite products" as used herein means layered wood products made from veneers as defined above.

Different veneers can be in different layers, or they can be part of the same layer. For instance, veneers can be laterally placed with respect to one another (i.e., multiple veneers side-by-side to for a single layer). In this way, parameters such as compound, concentration, number of compounds, etc., can vary laterally across the face of the composite product, as well as with depth.

The term "layer" as used herein means an individual veneer which is a component of the "composite product." i.e., laminates, except when two or more veneers are laterally p/aced with respect to each other, in which case, a "layer" can comprise multiple veneers.

The uppermost or outermost layer of the composite product, sometimes used as a decorative layer in this application is also referred to as "finishing layer," which is laminated to a substrate in the composite product or included during the manufacturer of the composite product.

When used in reference to a composite which has layers of more than one material, "differential treatment" means the layers of the composite are treated with different modalities or with the same modalities. Modalities can include treatment with a compound or composition, exposure to heat, light or electromagnetic radiation, or other means of treatment. When used in reference to a composite which has multiple layers of the same material, the term "differential treatment" means the layers are treated with different modalities.

In one embodiment, differential treatment can mean the treatment of different component layers with different compounds prior to their assembly into a composite wood product. A non-limiting example is the treatment of two component layers, a first and second layer, with a biocide and color stain, respectively, after or prior to assembly.

In another embodiment, differential treatment can mean treatment of different layers within the same composite product prior to or after assembly into a composite product. A non-limiting example is the creation of a layered gradient of treatments within the composite product; if desired, the treatment of the layers intended to be positioned as outer layers can be treated to a higher concentration of a biocide than layers intended to be positioned as inner layers. In this way, the presence of biocide at interior positions in the wood product is assured, yet the composite product can be engineered to reflect the reduced exposure of the inner layers to biological deterioration, weathering, UV or fire, the risk of the exposure of the composite product to fungi, decay, rot, insect attack, termites including mastotermes, macrotermes and coptoptermes species including formosanus. The method of the present invention allows the fabrication of a composite product in which the concentration of a treatment compound or additive can vary with the position of a veneer in a composite product. The variation of concentration with layer can be tailored to meet the intended use of the composite product. Examples of compounds which can be varied include insecticides, termiticides, fungicides, algaecides, additives, fire retardants, UV blockers, water repellents, mineral oils, vegetable oils, drying oils, resins, polymers, acrylics, isocyanates, wood hardeners, dyes, pigments, colorants or combination of the above in different diluents as water, organic solvents, white spirits, light oil, other hydrocarbons, drying oils, linseed oil, fish oils throughout. The varying concentration can reflect the spatially varying parameters encountered in a given application.

In yet another embodiment differential treatment is the treatment of layers such that some layers contain fewer or greater numbers of compounds than other layers. An example is the treatment of component layers with a biocide, where the component layer which is to be the surface layer additionally treated with a compound which improves durability, such as a compound which imparts to the wood an increased resistance ultraviolet radiation. It is thus within scope of the present invention to treat some or all layers with a first treatment, followed by the treatment of some, but not all, of these layer with a second treatment, etc., after or prior to assembly.

In general, "differential treatment" includes the treatment, after or prior to assembly, of at least two component layers, in a manner such that they contain different additive compounds, concentrations of additive compounds, or number of additive compounds.

The term "differential treatment" can include the treatment of a composite product after it has been assembled. For example, a composite product which comprises layers of both wood and a substance requiring curing can be assembled prior to complete curing. Additional curing can be done after assembly.

In some cases, it may be desirable to allow one or more veneers to remain untreated. For example, inner layers of wood or other materials may be shielded from the elements by outer layers, and there may be no need to treat them for insect and fungus resistance, uv resistance, fire resistance, etc.

Treatment compounds which can be used in the product and method of the present invention are compounds such as biocides (fungicides, insecticides, bactericides, moldicides, termiticides, etc.); paints, stains, colorants, pigments, precoats, wear and weather resistors, UV blockers wood hardening compounds, fire retardants.

The present invention also provides methods for making the composite product. One of the methods comprises the steps 1) differentially treating two or more component layers, and 2) fabricating a composite wood product by laminating the two or more layers into a composite product. In one embodiment, the component layers are laminated such that one of the two or more component layers is the surface layer of the composite product. In a further embodiment, the component layers are laminated such that another of the two or more component layers is attached to the surface layer. A second example comprises the following steps: 1) treating the layers after or prior to the manufacturing of the composite product; 2) assembling the layers into a composite product; and 3) treating the composite product with a second treatment that will provide a "differential treatment" on the outer layers of the composite product. A third example comprises the following steps: 1) treating the composite product as in examples 1 or 2; and adding additional layers to form another composite product. These added layers can be inert material such as wood/plastic composite, other plastics, synthetic polymers, resin type layers or film that provide the composite product with different characteristics. Other examples may comprise a combination of the previous examples.

The final configuration of layers depends upon the performance needed for a given end-use service application. For example, a low performance composite product may comprise biocide treated component layers, with surface layers being additionally treated with water-repellent polymers and UV resistant pigments. A higher performance composite product, for use in, for example, decking, may comprise core layers which are treated with biocide, water repellent polymers and UV resistant pigments, and surface layers which are similarly treated, but also include a wood hardener to protect against abrasion and wear. The present invention provides the ability to meet specific performance requirements for selected service needs or market economic targets.

Examples of composite products which can be made according to the method include, but are not limited to, plywood, laminated veneer lumber (LVL), I-joist, other veneer based products, glued laminated lumber or GLUE-LAM, block board, oriented stranded board (OSB), parallel stranded boards (PSB), particleboard, medium density boards (MDF), wood laminates, and other products which are layer-based; wherein the layers are comprised of wood, partial wood or alternative materials; wherein at least one of the layers is or comprises a cellulosic material. The composite product can be engineered for use in a wide range of conditions and applications such as, for example, indoor, outdoor conditions and/or in-ground contact.

In one embodiment, the outer, exposed surface component layers are chemically treated with biocides, pigments and weather durable polymer compounds to shield and protect the inner component layers, which may only be treated with biocides and pigments. In a further embodiment, decking or fencing board could be produced with the necessary biocide protection throughout the entire board product, with added weather durability needed on the outer exposed faces for best total protection against wood destroying organisms and weather degradation.

Additives such as, for example, pigments, dyes, fire retardants, biocides, etc. Examples of pigments which can be used are uv stabilizers. Non-limiting examples of UV stabilizers include UV light absorbers such as complex substituted aromatic compounds, UV light stabilizers such as complex hindered tertiary amines, and anti-oxidants.

If desired, pigments can be included in the composition. The pigments which can be used in the compositions of the present invention include inorganic and organic pigments. Inorganic pigments include compounds of metals such as iron, zinc, titanium, lead, chromium, copper, cadmium, calcium, zirconium, cobalt, magnesium, aluminum, nickel, and other transition metals. Carbon black is also an inorganic pigment.

Some non-limiting examples of suitable inorganic pigments include: iron oxides, including red iron oxides, yellow iron oxides, black iron oxides and brown iron oxides; carbon black, iron hydroxide, graphite, black micaceous iron oxide; aluminum flake pigments, pearlescent pigments; calcium carbonate; calcium phosphate; calcium oxide; calcium hydroxide; bismuth oxide; bismuth hydroxide; bismuth carbonate; copper carbonate; copper hydroxide; basic copper carbonate; silicon oxide; zinc carbonate; barium carbonate; barium hydroxide; strontium carbonate; zinc oxide; zinc phosphate; zinc chromate; barium chromate; chrome oxide; titanium dioxide; zinc sulfide and antimony oxide, lead chrome, and cadmium pigments.

Preferred inorganic pigments are carbon black; graphite; iron oxides, including yellow, red, black and brown iron oxides; zinc oxide; titanium oxide and aluminum-based pigments, such as, for example $Al_2O_3$ $Al(OH)_3$.

Non-limiting examples of organic pigments include Monoazo (arylide) pigments such as PY3, PY65, PY73, PY74, PY97 and PY98; Disazo (diarylide); Disazo condensation; Benzimidazolone; Beta Naphthol; Naphthol; metal-organic complexes; Isoindoline and Isoindolinone; Quinacridone; perylene; perinone; anthraquinone; diketo-pyrrolo pyrrole; dioxazine; triacrylcarbonium; the phthalocyanine pigments, such as cobalt phthalocyanine, copper phthalocyanine, copper semichloro- or monochlorophthalocyanine, copper phthalocyanine, metal-free phthalocyanine, copper polychlorophthalocyanine, etc.; organic azo compounds; organic nitro compounds; polycyclic compounds, such as phthalocyanine pigments, quinacridone pigments, perylene and perinone pigments; diketopyrrolo-pyrrole(DPP) pigments; thioindigo pigments; dioxazine pigments; quinophthalone pigments; triacrylcarbonium pigments, and Diaryl pyrrolopyroles, such as PR254.

Non-limiting examples of fire retardants include phosphorus compounds such as ammonia phosphate, ammonia polyphosphate, guanidine phosphate and melamine phosphate, boron compounds such as zinc borate and boric acid, metal carbonates such as Huntite ($3MgCO_3xCaCO_3$) and Hydromagnesite ($Mg_5(CO_3)_4(OH)_2x4H_2O$), metal hydroxides such as aluminum trihydroxide and magnesium hydroxide, organic halogen compounds such as chlorinated paraffins and brominated compounds, and urea can also be included in this composition. The halogenated materials may be used alone or together with antimony compounds such as antimony trioxide or antimony pentoxide which are thought to act as synergists.

Examples of biocides include water soluble or water insoluble inorganic or organic fungicides, insecticides, moldicides, bactericides, algaecides, such as for example, azoles, quaternary ammonium compounds, borate compounds, fluoride compounds and combinations thereof.

Some non-limiting examples of water insoluble organic biocides are listed as follows.

Aliphatic Nitrogen Fungicides
butylamine; cymoxanil; dodicin; dodine; guazatine; iminoctadine Amide Fungicides
carpropamid; chloraniformethan; cyazofamid; cyflufenamid; diclocymet; ethaboxam; fenoxanil; flumetover; furametpyr; prochloraz; quinazamid; silthiofam; triforine benalaxyl; benalaxyl-M; furalaxyl; metalaxyl; metalaxyl-M; pefurazoate; benzohydroxamic acid; tioxymid; trichlamide; zarilamid; zoxamide; cyclafuramid; furmecyclox dichlofluanid; tolylfluanid benthiavalicarb; iprovalicarb; benalaxyl; benalaxyl-M; boscalid; carboxin; fenhexamid; metalaxyl; metalaxyl-M; metsulfovax; ofurace; oxadixyl; oxycarboxin; pyracarbolid; thifluzamide; tiadinil; benodanil; flutolanil; mebenil; mepronil; salicylanilide; tecloftalam; fenfuram; furalaxyl; furcarbanil; methfuroxam; flusulfamide Antibiotic Fungicides
aureofungin; blasticidin-S; cycloheximide; griseofulvin; kasugamycin; natamycin; polyoxins; polyoxorim; streptomycin; validamycin; azoxystrobin; dimoxystrobin; fluoxastrobin; kresoxim-methyl; metominostrobin; orysastrobin; picoxystrobin; pyraclostrobin; trifloxystrobin Aromatic Fungicides
biphenyl; chlorodinitronaphthalene; chloroneb; chlorothalonil; cresol; dicloran; hexachlorobenzene; pentachlorophenol; quintozene; sodium pentachlorophenoxide; tecnazene Benzimidazole Fungicides
benomyl; carbendazim; chlorfenazole; cypendazole; debacarb; fuberidazole; mecarbinzid; rabenzazole; thiabendazole Benzimidazole Precursor Fungicides
furophanate; thiophanate; thiophanate-methyl Benzothiazole Fungicides
bentaluron; chlobenthiazone; TCMTB Bridged Diphenyl Fungicides
bithionol; dichlorophen; diphenylamine Carbamate Fungicides
benthiavalicarb; furophanate; iprovalicarb; propamocarb; thiophanate; thiophanate-methyl; benomyl; carbendazim; cypendazole; debacarb; mecarbinzid; diethofencarb Conazole Fungicides
climbazole; clotrimazole; imazalil; oxpoconazole; prochloraz; triflumizole; azaconazole; bromuconazole; cyproconazole; diclobutrazole; difenoconazole; diniconazole; diniconazole-M; epoxiconazole; etaconazole; fenbuconazole; fluquinconazole; flusilazole; flutriafol; furconazole; furconazole-cis; hexaconazole; imibenconazole; ipconazole; metconazole; myclobutanil; penconazole; propiconazole; prothioconazole; quinconazole; simeconazole;

tebuconazole; tetraconazole; triadimefon; triadimenol; triticonazole; uniconazole; uniconazole-P Dicarboximide Fungicides famoxadone; fluoroimide; chlozolinate; dichlozoline; iprodione; isovaledione; myclozolin; procymidone; vinclozolin; captafol; captan; ditalimfos; folpet; thiochlorfenphim Dinitrophenol Fungicides binapacryl; dinobuton; dinocap; dinocap-4; dinocap-6; dinocton; dinopenton; dinosulfon; dinoterbon; DNOC Dithiocarbamate Fungicides azithiram; carbamorph; cufraneb; cuprobam; disulfiram; ferbam; metam; nabam; tecoram; thiram; ziram; dazomet; etem; milneb; mancopper; mancozeb; maneb; metiram; polycarbamate; propineb; zineb Imidazole Fungicides cyazofamid; fenamidone; fenapanil; glyodin; iprodione; isovaledione; pefurazoate; triazoxide Morpholine Fungicides aldimorph; benzamorf; carbamorph; dimethomorph; dodemorph; fenpropimorph; flumorph; tridemorph Organophosphorus Fungicides ampropylfos; ditalimfos; edifenphos; fosetyl; hexylthiofos; iprobenfos; phosdiphen; pyrazophos; tolclofos-methyl; triamiphos Oxathiin Fungicides carboxin; oxycarboxin Oxazole Fungicides chlozolinate; dichlozoline; drazoxolon; famoxadone; hymexazol; metazoxolon; myclozolin; oxadixyl; vinclozolin Pyridine Fungicides boscalid; buthiobate; dipyrithione; fluazinam; pyridinitril; pyrifenox; pyroxychlor; pyroxyfur Pyrimidine Fungicides bupirimate; cyprodinil; diflumetorim; dimethirimol; ethirimol; fenarimol; ferimzone; mepanipyrim; nuarimol; pyrimethanil; triarimol Pyrrole Fungicides fenpiclonil; fludioxonil; fluoroimide Quinoline Fungicides ethoxyquin; halacrinate; 8-hydroxyquinoline sulfate; quinacetol; quinoxyfen Quinone Fungicides benquinox; chloranil; dichlone; dithianon Quinoxaline Fungicides chinomethionat; chlorquinox; thioquinox Thiazole Fungicides ethaboxam; etridiazole; metsulfovax; octhilinone; thiabendazole; thiadifluor; thifluzamide Thiocarbamate Fungicides methasulfocarb; prothiocarb Thiophene Fungicides ethaboxam; silthiofam Triazine Fungicides anilazine Triazole Fungicides bitertanol; fluotrimazole; triazbutil Urea Fungicides bentaluron; pencycuron; quinazamid Other Fungicides acibenzolar; acypetacs; allyl alcohol; benzalkonium chloride; benzamacril; bethoxazin; carvone; chloropicrin; DBCP; dehydroacetic acid; diclomezine; diethyl pyrocarbonate; fenaminosulf; fenitropan; fenpropidin; formaldehyde; furfural; hexachlorobutadiene; iodomethane; isoprothiolane; methyl bromide; methyl isothiocyanate; metrafenone; nitrostyrene; nitrothal-isopropyl; OCH; 2 phenylphenol; phthalide; piperalin; probenazole; proquinazid; pyroquilon; sodium orthophenylphenoxide; spiroxamine; sultropen; thicyofen; tricyclazole Preferred insecticides which can be mixed with non-aqueous water repellent composition disclosed in the present invention are:

Antibiotic Insecticides allosamidin; thuringiensin; spinosad; abamectin; doramectin; emamectin; eprinomectin; ivermectin; selamectin; milbemectin; milbemycin oxime; moxidectin Botanical Insecticides anabasine; azadirachtin; d-limonene; nicotine; pyrethrins cinerins; cinerin I; cinerin II; jasmolin I; jasmolin II; pyrethrin I; pyrethrin II; quassia; rotenone; ryania sabadilla Carbamate Insecticides bendiocarb; carbaryl; benfuracarb; carbofuran; carbosulfan; decarbofuran; furathiocarb; dimetan; dimetilan; hyquincarb; pirimicarb; alanycarb; aldicarb; aldoxycarb; butocarboxim; butoxycarboxim; methomyl; nitrilacarb; oxamyl; tazimcarb; thiocarboxime; thiodicarb; thiofanox; allyxycarb; aminocarb; bufencarb; butacarb; carbanolate; cloethocarb; dicresyl; dioxacarb; EMPC; ethiofencarb; fenethacarb; fenobucarb; isoprocarb; methiocarb; metolcarb; mexacarbate; promacyl; promecarb; propoxur; trimethacarb; XMC; xylylcarb Dinitrophenol Insecticides dinex; dinoprop; dinosaur; DNOC; cryolite; sodium hexafluorosilicate; sulfiuramid Formamidine Insecticides amitraz; chlordimeform; formetanate; formparanate Fumigant Insecticides acrylonitrile; carbon disulfide; carbon tetrachloride; chloroform; chloropicrin; para-dichlorobenzene; 1,2-dichloropropane; ethyl formate; ethylene dibromide; ethylene dichloride; ethylene oxide; hydrogen cyanide; iodomethane; methyl bromide; methylchloroform; methylene chloride; naphthalene; phosphine; sulfuryl fluoride; tetrachloroethane Insect Growth Regulators bistrifluron; buprofezin; chlorfluazuron; cyromazine; diflubenzuron; flucycloxuron; flufenoxuron; hexaflumuron; lufenuron; novaluron; noviflumuron; penfluron; teflubenzuron; triflumuron; epofenonane; fenoxycarb; hydroprene; kinoprene; methoprene; pyriproxyfen; triprene; juvenile hormone 1; juvenile hormone II; juvenile hormone III; chromafenozide; halofenozide; methoxyfenozide; tebufenozide; α-ecdysone; ecdysterone; diofenolan; precocene I; precocene II; precocene III; dicyclanil Nereistoxin Analogue Insecticides bensultap; cartap; thiocyclam; thiosultap; flonicamid; clothianidin; dinotefuran; imidacloprid; thiamethoxam; nitenpyram nithiazine; acetamiprid; imidacloprid; nitenpyram; thiacloprid Organochlorine Insecticides bromo-DDT; camphechlor; DDT; pp'-DDT; ethyl-DDD; HCH; gamma-HCH; lindane; methoxychlor; pentachlorophenol; TDE; aldrin; bromocyclen; chlorbicyclen; chlordane; chlordecone; dieldrin; dilor; endosulfan; endrin; HEOD; heptachlor; HHDN; isobenzan; isodrin; kelevan; mirex Organophosphorus Insecticides bromfenvinfos; chlorfenvinphos; crotoxyphos; dichlorvos; dicrotophos; dimethylvinphos; fospirate; heptenophos; methocrotophos; mevinphos; monocrotophos; naled; naftalofos; phosphamidon; propaphos; schradan; TEPP; tetrachlorvinphos; dioxabenzofos fosmethilan phenthoate;

acethion; amiton; cadusafos; chlorethoxyfos; chlormephos; demephion; demephion-O; demephion-S; demeton; demeton-O; demeton-S; demeton-methyl; demeton-O-methyl; demeton-S-methyl; demeton-S-methylsulphon; disulfoton ethion; ethoprophos; IPSP; isothioate; malathion; methacrifos; oxydemeton-methyl; oxydeprofos; oxydisulfoton phorate; sulfotep; terbufos; thiometon amidithion; cyanthoate; dimethoate; ethoate-methyl; formothion mecarbam; ornethoate; prothoate; sophamide; vamidothion chlorphoxim; phoxim; phoxim-methyl azamethiphos; coumaphos; coumithoate; dioxathion; endothion; menazon; morphothion; phosalone; pyraclofos; pyridaphenthion; quinothion; dithicrofos; thicrofos; azinphos-ethyl; azinphos-methyl; dialifos; phosmet; isoxathion; zolaprofos; chlorprazophos; pyrazophos; chlorpyrifos; chlorpyrifos-methyl; butathiofos; diazinon; etrimfos; lirimfos; pirimiphos-ethyl; pirimiphos-methyl; primidophos; pyrimitate; tebupirimfos; quinalphos; quinalphos-methyl; athidathion; lythidathion; methidathion; prothidathion; isazofos; triazophos; azothoate; bromophos; bromophos-ethyl; carbophenothion; chlorthiophos; cyanophos; cythioate; dicapthon; dichiofenthion; etaphos; famphur; fenchlorphos; fenitrothion; fensulfothion; fenthion; fenthion-ethyl; heterophos; jodfenphos; mesulfenfos; parathion; parathion-methyl; phenkapton; phosnichlor; profenofos; prothiofos; sulprofos; temephos; trichlormetaphos-3; trifenofos; butonate; trichlorfon; mecarphon; fonofos; trichloronat; cyanofenphos; EPN; leptophos; crufomate; fenamiphos; fosthietan; mephosfolan; phosfolan; pirimetaphos; acephate; isocarbophos; isofenphos; methamidophos; propetamphos; dimefox; mazidox; mipafox Oxadiazine Insecticides
indoxacarb
Phthalimide Insecticides
dialifos; phosmet; tetramethrin
Pyrazole Insecticides
acetoprole; ethiprole; fipronil; tebufenpyrad; tolfenpyrad; vaniliprole
Pyrethroid Insecticides
acrinathrin; allethrin; bioallethrin; barthrin; bifenthrin; bioethanomethrin; cyclethrin; cycloprothrin; cyfluthrin; beta-cyfluthrin; cyhalothrin; gamma-cyhalothrin; lambda-cyhalothrin; cypermethrin; alpha-cypermethrin; beta-cypermethrin; theta-cypermethrin; zeta-cypermethrin; cyphenothrin; deltamethrin; dimefluthrin; dimethrin; empenthrin; fenfluthrin; fenpirithrin; fenpropathrin; fenvalerate; esfenvalerate; flucythrinate; fluvalinate; tauflu-valinate; furethrin; imiprothrin; metofluthrin; permethrin; biopermethrin; transpermethrin; phenothrin; prallethrin; profluthrin; pyresmethrin; restnethrin; bioresmethrin; cismethrin; tefluthrin; teralethrin; tetramethrin; tralomethrin; transfluthrin; etofenprox; flufenprox; halfenprox; protrifenbute; silafluofen
Pyrimidinamine Insecticides
flufenerim; pyrimidifen
Pyrrole Insecticides
chlorfenapyr
Tetronic Acid Insecticides
spiromesifen
Thiourea Insecticides
diafenthiuron
Urea Insecticides
flucofuron; sulcofuron
Other Insecticides
closantel; crotamiton; EXD; fenazaflor; fenoxacrim; hydramethylnon; isoprothiolane; malonoben; metoxadiazone; nifluridide; pyridaben; pyridalyl; rafoxanide; triarathene; triazamate Preferred bactericides include:
bronopol; cresol; dichlorophen; dipyrithione; dodicin; fenaminosulf; formaldehyde; hydrargaphen; 8-hydroxyquinoline sulfate; kasugamycin; nitrapyrin; octhilinone; oxolinic acid; oxytetracycline probenazole; streptomycin tecloftalam thiomersal Non-biocidal products such as colorants, UV inhibitors, plasticizers, compatibility enhancing agents and the like may also be added to the system disclosed herein to further enhance the performance of the system or the appearance and performance of the resulting treated products.

Examples of composite products which can be manufactured according to the process of the present invention, including but do not restricted boards for decking, flooring, fencing, siding, verandah posts, fencing rails, poles, posts, sleepers, landscaping products, retaining wall material, sleepers, joists, bearers, beams, columns and trusses as well as other applications in which it is desirable that core layers be differentially treated for functional and economic reasons.

Methods of lamination which can be used in the process of the present invention use resins and glues including but not restricted to phenol formaldehyde, urea formaldehyde, melanine urea formaldehyde, other formaldehyde based resins, Polyvinyl Acetate, polyurethane, isocyanates, polyesters, acrylic, epoxy resins or natural resins as casein or resin from animals such as mussels, or a combination of the above. These resins can be applied by itself or in a "glue" comprising additional functional ingredients. Glues include fillers, examples of which include wheat, macadamia and rice flour. A second ingredient of the glue can be the catalyst, this can be very diverse and will depend on the type of resin used, the most common one is soda ash or caustic soda for phenol formaldehyde type resins, as extender is normally use water but other diluents can be used.

The resin or glue is spread by spraying, brushing or rolling onto the surfaces of the layers to be joined together. The layers are pressed together using a range of pressures from atmospheric up to 3,000 psi or greater, and can be constant or varied during the pressing stage of the manufacturing procedure. The pressures Temperatures, often in the range of from room-temperature to 500° C., can be used to in the process, before, during or after the pressure period. Temperature used can be variable. Other parameters or physical conditioning can be used during the manufacturing process and more specific during the gluing of Layers, this can be microwave, high frequency, steam, gasses of $CO_2$, Nitrogen, ammonia, and other gases.

EXAMPLES

Example 1

A Four Laminate Decking Board Product

The top laminate (veneer) of a dry, less than 15% moisture content, solid wood having a thickness of 0.25 inches will be impregnated using a vacuum pressure process with an appropriate biocide formulation with additional performance enhancing additives. The biocide formulation will contain 5 parts tebuconazole, (a fungicide) and 1 part bifenthrin, (an insecticide) and will be impregnated into the wood at a active biocide retention of 0.012 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. The fungicide, insecticide, and moldicide mixture will also be combined prior to impregnation into the wood with durable UV resistant inorganic iron oxide color pigments and a mixture of hydrophobic oils and paraffin waxes for water repellency performance to help the top wood laminate withstand direct exposure to the degrading effects of exterior weather, including moisture uptake which swells the wood dimension, as well as heating and harsh drying caused by direct sunlight (UV) exposure. Such harsh drying could otherwise result in Wood dimension shrinkage, particularly on horizontally positioned deck boards.

The middle two dry (less than 15% moisture content) solid wood laminates (veneers), each of 0.25 inches thickness will add needed bending and compressive strength to the wood laminate deck board product. The middle two solid wood laminates each will be impregnated using a vacuum pressure process with an appropriate biocide formulation. The biocide formulation will contain 5 parts tebuconazole, (a fungicide) and 1 part bifenthrin, (an insecticide) and will be impregnated into the wood at an active biocide retention of 0.012 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. A wood hardening, strength enhancing monomer such as dicyclopentadiene, Poly-DCPD, a plastic resin polymer, can also be added to the biocide treatment formulation prior to the impregnation step. The Poly-DCPD will be impregnated into the wood at retention of 15 pcf and then polymerized in the wood using specific catalysts to control the polymerization process to add, in this case, additional bending and compressive strength properties to the finished wood laminate deck board product.

A bottom laminate (veneer) of a dry, (less than 15% moisture content) solid wood having a thickness of 0.25 inches will be impregnated using a vacuum pressure process with an appropriate biocide formulation. The biocide formulation will contain 5 parts tebuconazole, (a fungicide) and 1 part bifenthrin, (an insecticide) and will be impregnated into the wood at an active ingredient biocide retention of 0.012 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. The treated wood laminates will then be cured or re-dried after the biocide impregnation process treatment.

After differential pretreatment impregnation, then re-drying, curing or a polymerization step is undertaken resulting in the impregnated wood veneer reaching a final moisture content of less than 15%, the top, two middle and bottom veneers will be laminated together to form a composite product by using conventional wood lamination processing which incorporates appropriate glue resins applied between the wide faces of the treated solid wood veneers, placing the veneers into the desired wide face to wide face contact in a "stacked or sandwiched" configuration, and then applying high compressive pressure in a perpendicular direction evenly across the entire wide face surface area of the veneers using vacuum hydraulic press machinery along with elevated temperature exposure to the veneers to aid in the rapid setting and curing of the veneer bonding resins to form a solid, one piece multi-veneer wood laminate deck board.

Example 2

A Three Laminate Decking Board Product

The top laminate (veneer) of a dry, (less than 15% moisture content) solid wood having a thickness of 0.25 inches is impregnated using a vacuum pressure process with an appropriate biocide formulation with additional performance enhancing additives. The biocide formulation will contain oxine copper, a wood preservative and will be impregnated into the wood at a active biocide retention of 0.02 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. The wood preservative and moldicide mixture will also be combined prior to impregnation into the wood with durable UV resistant inorganic iron oxide color pigments. Additionally, a water resistant, wood hardening, strength enhancing monomer such as dicyclopentadiene, Poly-DCPD, a plastic resin polymer, can also be added to the wood treatment formulation prior to the impregnation step. The Poly-DCPD will be impregnated into the wood at retention of 25 pcf and is then polymerized in the wood using specific catalysts to control the polymerization process. UV resistant pigment with monomer polymerized top wood laminate can withstand direct exposure to the degrading effects of exterior weather, including moisture uptake which swells the wood dimension, as well as heating and harsh drying caused by direct sunlight (UV) exposure. Such harsh drying could otherwise result in wood dimension shrinkage, particularly on horizontally positioned deck boards. The hardening monomer polymerization will also impart resistance to surface marring, and scuffing due to abrasive foot traffic on top wood laminate horizontal decking board surface.

A middle laminate (veneer) of a dry, (less than 15% moisture content) solid wood having a thickness of 0.25 inches will be impregnated using a vacuum pressure process with an appropriate biocide formulation with additional performance enhancing additives. The biocide formulation will contain oxine copper, a wood preservative and will be impregnated into the wood at an active biocide retention of 0.02 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. Additionally, a water resistant, wood hardening, strength enhancing monomer such as dicyclopentadiene, Poly-DCPD can also be added to the wood treatment formulation prior to the impregnation step. The Poly-DCPD will be impregnated into the wood at retention of 15 pcf and will then be polymerized in the wood using specific catalysts to control the polymerization process to add, in this case, additional bending and compressive strength properties to the finished wood laminate deck board product.

A bottom laminate (veneer) of a dry (less than 15% moisture content) solid wood laminate having a thickness of 0.25 inches will be impregnated using a vacuum pressure process with an appropriate biocide formulation with additional performance enhancing additives. The biocide formulation will contain oxine copper, a wood preservative and will be impregnated into the wood at a active biocide retention of 0.02 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. After differential pretreatment impregnation, then re-drying, curing or a polymerization step will be undertaken resulting in the impregnated wood veneers reaching a final moisture content of less than 15%, the top, middle and bottom veneers will be laminated together to form a composite product by using conventional wood lamination processing which will incorporate appropriate glue resins applied between the wide faces of the treated solid wood veneers, placing the veneers into the desired wide face to wide face contact in a "stacked or sandwiched" configuration, and then applying high compressive pressure in a perpendicular direction evenly across the entire wide face surface area of the veneers using vacuum hydraulic press machinery along with elevated temperature exposure to the veneers to aid in the rapid setting and curing of the veneer bonding resins to form a solid, one piece multi-veneer wood laminate deck board.

Example 3

A Two Laminate Decking Board

A top laminate (veneer) having a thickness of 0.25 inches will be made from a wood plastic composite comprised of wood saw dust fiber and a HDPE (high density polyethylene). Wood plastic composites materials exhibit greater dimensional stability, durability, and sunlight (UV) degradation resistant. The wood plastic composite further will be comprised of durable color, UV resistant inorganic iron oxide pigments which will be added to the wood plastic composite product during the high temperature extrusion process to impart an aesthetic appearance to the top weather protective laminate.

A bottom laminate of a dry (less than 15% moisture content) solid wood laminate having a thickness of 1.0 inches will be impregnated using a vacuum pressure process with an appropriate biocide formulation with additional performance enhancing additives. The biocide formulation will contain a copper quaternary wood preservative and will be impregnated into the wood at an active retention of 0.15 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. The 1.0 inch thickness solid wood bottom laminate will supply rigidity, and structural strength for the wood plastic composite solid wood laminate deck board product. After extrusion of the 0.25 inch thickness wood plastic composite laminate comprised of wood saw dust fiber and a HDPE (high density polyethylene), and pretreatment impregnation then re-drying, curing or a polymerization step will be undertaken resulting in the impregnated wood veneer reaching a final moisture content of less than 15%, the top wood plastic, and bottom solid wood veneers will be laminated together to form a composite product by using conventional lamination processing which incorporates appropriate glue resins applied between the wide faces of the treated solid wood veneers, placing the veneers into the desired wide face to wide face contact in a "stacked or sandwiched" configuration, and then applying high compressive pressure in a perpendicular direction evenly across the entire wide face surface area of the veneers using vacuum hydraulic press machinery low (ambient) temperature exposure to the veneers to aid in the rapid setting and curing of the veneer bonding resins to form a solid, one piece multi-veneer wood laminate deck board.

Example 4

A Two Laminate House Siding Board

A top laminate (veneer) having a thickness of 0.25 inches will be made from a cellulose fiber-reinforced cement material that is moisture proof, fire proof, resistant to decay, and termites. UV resistance, durable color will be imparted by adding inorganic iron oxide, or zinc oxide pigments to the material mixture to a retention.

A bottom laminate of a dry (less than 15% moisture content) solid wood laminate having a thickness of 0.5 inches will be impregnated using a vacuum pressure process with an appropriate biocide formulation with additional performance enhancing additives. The biocide formulation will contain a quaternary wood preservative and will be impregnated into the wood at an active retention of 0.20 pcf to protect against wood rot, decay, and termite attack. Additionally, 45 parts per million of an effective moldicide such as an isothiazolone compound will be added to the tebuconazole and bifenthrin mixture prior to the impregnation step to add additional protection to the treated wood against mold and mildew attack. The bottom solid wood laminate adds needed structural stiffness and enhanced bending strength to the finished laminated siding product. After manufacture of the 0.25 thickness cellulose fiber-reinforced cement material and pretreatment impregnation, then re-drying, curing or a polymerization step will be undertaken resulting in the impregnated wood veneer reaching a final moisture content of less that 15%, the top cellulose fiber-reinforced cement and bottom solid wood veneers will be laminated together to form a composite product by using conventional lamination processing which incorporates appropriate glue resins applied between the wide faces of the veneers, placing the veneers into the desired wide face to wide face contact in a "stacked or sandwiched" configuration, and then applying high compressive pressure in a perpendicular direction evenly across the entire wide face surface area of the veneers using vacuum hydraulic press machinery an elevated temperature exposure to the veneers to aid in the rapid setting and curing of the veneer bonding resins to form a solid, one piece multi-veneer wood laminate deck board.

I claim:

1. A composite product comprising:
   a) a finishing layer consisting of a solid wood comprising one or more fungicides; and
   b) a second layer comprising one or more fungicides;
   wherein said second layer contains a greater concentration of said one or more fungicides than said finishing layer.

2. The composite product of claim 1, wherein said fungicide is tebuconazole.

3. The composite product of claim 1, wherein said finishing layer further comprises one or more agents selected from the group consisting of moldicides, water repellents, UV blockers, pigments, fire retardants, wood hardeners and strength enhancers.

4. The composite product of claim 3, wherein said finishing layer comprises a strength enhancer.

5. The composite product of claim 4, wherein said strength enhancer is dicyclopentadiene.

6. The composite product of claim 3, wherein said finishing layer comprises a moldicide.

7. The composite product of claim 6, wherein said moldicide is an isothiazolone.

8. The composite product of claim 1, wherein said finishing and second layers are laminated.

9. A composite product comprising:
   a) a finishing layer consisting of a solid wood, wherein said finishing layer does not contain a fungicide; and
   b) a second layer comprising one or more fungicides.

10. The composite product of claim 9, wherein said fungicide is tebuconazole.

11. The composite product of claim 9, wherein said finishing layer further comprises one or more agents selected from the group consisting of moldicides, water repellents, UV blockers, pigments, fire retardants, wood hardeners and strength enhancers.

12. The composite product of claim 11, wherein said finishing layer comprises a strength enhancer.

13. The composite product of claim 12, wherein said strength enhancer is dicyclopentadiene.

14. The composite product of claim 11, wherein said finishing layer comprises a moldicide.

15. The composite product of claim 14, wherein said moldicide is an isothiazolone.

16. The composite product of claim 9, wherein said finishing and second layers are laminated.

17. A composite product comprising:
   a) a finishing layer consisting of a solid wood optionally comprising one or more aqueous compositions comprising an agent selected from the group consisting of biocides, water repellents, UV blockers, pigments, fire retardants, wood hardeners and strength enhancers; and
   b) a second layer comprising one or more aqueous compositions comprising an agent selected from the group consisting of biocides and strength enhancers, wherein said second layer: 1) contains either a fewer or a greater number of the agents than said finishing layer; or 2) contains either a greater or lesser concentration of one of the agents than said finishing layer.

18. The composite product of claim 17, wherein said second layer comprises an aqueous composition comprising a biocide.

19. The composite product of claim 17, wherein said finishing and second layers are laminated.

20. A method of preparing a composite product comprising the steps of:
   a) providing a finishing layer consisting of a solid wood optionally comprising one or more fungicides;
   b) providing a second layer comprising one or more fungicides, wherein said second layer contains a greater concentration of said one or more fungicides than said finishing layer; and
   c) laminating said layers to produce a composite product.

21. The method of claim 20, wherein said fungicide is tebuconazole.

22. The method of claim 20, wherein said finishing layer comprises one or more agents selected from the group consisting of moldicides, water repellents, UV blockers, pigments, fire retardants, wood hardeners and strength enhancers.

23. The method of claim 22, wherein said finishing layer comprises a strength enhancer.

24. The method of claim 23, wherein said strength enhancer is dicyclopentadiene.

25. The method of claim 24, further comprising a step of polymerizing the strength enhancer.

26. The method of claim 22, wherein said finishing layer comprises a moldicide.

27. The method of claim 26, wherein the moldicide is an isothiazolone.

28. A composite product produced by the method of claim 20.

29. A method of preparing a composite product comprising the steps of:
   a) providing a finishing layer consisting of a solid wood optionally comprising one or more aqueous compositions comprising an agent selected from the group consisting of biocides, water repellents, UV blockers, pigments, fire retardants, wood hardeners and strength enhancers;
   b) providing a second layer comprising one or more aqueous compositions comprising an agent selected from the group consisting of biocides and strength enhancers, wherein said second layer: 1) contains either a fewer or a greater number of the agents than said finishing layer; or 2) contains either a greater or lesser concentration of one of the agents than said finishing layer; and
   c) laminating said layers to produce a composite product.

30. The method of claim 29, wherein said solid wood finishing layer comprises at least one aqueous composition comprising a biocide and said second layer comprises a lesser concentration of said biocide than said solid wood finishing layer.

31. The method of claim 29, wherein said biocide is selected from the group consisting of tebuconazole, bifenthrin, oxine copper, cyproconazole, propiconazole, imidacloprid, permethrin, quaternary ammonium compounds, borate compounds, triadimefon, and other copper compounds.

32. The method of claim 29, wherein said strength enhancer is dicyclopentadiene.

33. The method of claim 32, further comprising a step of polymerizing the strength enhancer.

34. The method of claim 29, wherein said biocide is a molidicide.

35. The method of claim 34, wherein said molidicide is an isothiazolone.

36. The method of claim 29, wherein said second layer comprises an aqueous composition comprising a biocide.

37. A composite product produced by the method of claim 29.

* * * * *